Jan. 22, 1935.  G. DIRR  1,988,646
EYEGLASSES
Filed Feb. 26, 1934
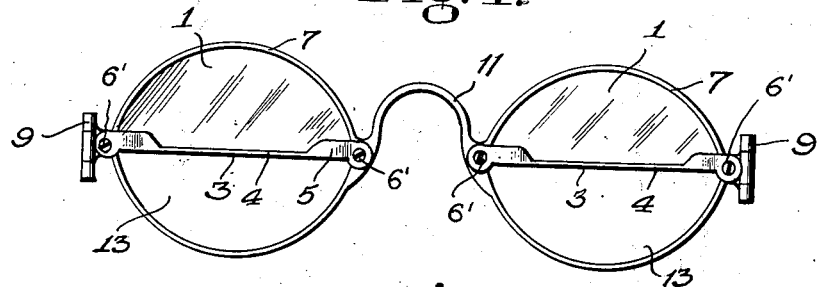
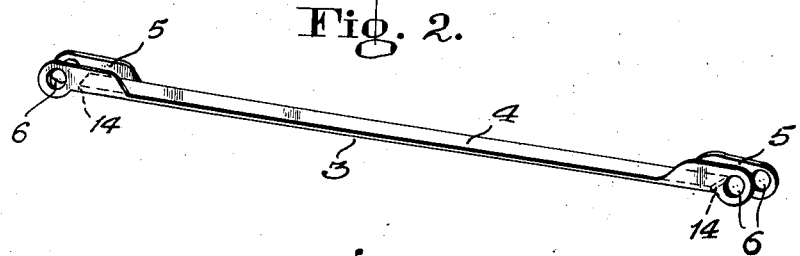
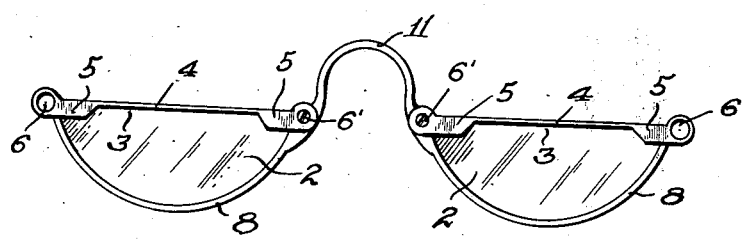
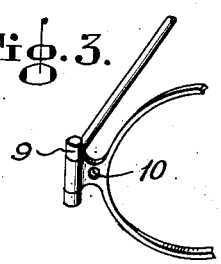
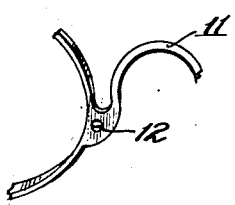
INVENTOR.
George Dirr.

Patented Jan. 22, 1935

1,988,646

UNITED STATES PATENT OFFICE 1,988,646

EYEGLASSES

George Dirr, Cincinnati, Ohio

Application February 26, 1934, Serial No. 712,986

3 Claims. (Cl. 88—47)

My invention relates to improvements in eyeglasses having half lenses only.

An object of my invention is to provide a pair of eyeglasses with a clip for securing half lenses in position.

A further object of my invention is to provide a pair of eyeglasses with a clip which eliminates the necessity of providing an aperture in the lens.

Another object of my invention is to provide means for eliminating the necessity of using cement for securing the lens in position.

Other objects will become apparent from the following description and drawing.

In the accompanying drawing, forming a part of this specification, and in which like numerals are employed to designate like parts throughout the same, Figure 1 is a view of a pair of eyeglasses embodying my invention showing two half lenses in their upper position.

Figure 2 is an enlarged view of the clip member according to my invention.

Figure 3 is a view of the hinge member.

Figure 4 is a view of the bridge member.

Figure 5 is a view of a modification of my invention showing a pair of eyeglasses with two half lenses secured in their lower position and with half rims.

Referring now to the drawing, reference numeral 1 is the far sighted half lens or lens for enabling one to see more distinctly in the distance, while 2 is the near sighted half lens or lens for enabling one to see more distinctly at close range. 3 is the clip member having a band 4, the ends of which are provided with wings 5 having holes 6. 7 represents the full rim in Figure 1 while 8 shows a half rim in Figure 5. The conventional hinge member is shown at 9 and the bridge member at 11. The holes 10 and 12 are adjacent respectively to the hinge member 9 and the bridge member 11. The open half of the eye piece is shown at 13 in Figure 1.

When the far sighted lens or upper half lens is used the clip member 3 is positioned so that the wings 5 project upwardly and conversely when a near sighted lens, such as 2, is used the clip member 3 is reversed so that the wing portions 5 project downwardly. The wings 5 have portions extending beyond the end 14 of the band 4 so as to form forked end portions and these portions are provided with the holes 6. The purpose for the extended portions will be hereinafter described.

When fitting a lens into the eyeglasses the lens is first positioned in the rim 7 which is of a conventional type. The clip member 3 is next placed on the flat edge of the lens so that the lens fits between the wings 5 which serve as a support for the lens and prevent lateral movement thereof. The extended portions of the wings 5 which are provided with the holes 6 engage with the hinge member 9 so that the hole 6 coincides with the hole 10 and also engage at the opposite end with the bridge member 11 so that the hole 6 coincides with the hole 12. These members are then secured together by conventional means such as by a screw 6' as shown in Figure 1.

It can readily be seen that the same procedure is followed regardless of whether an upper half lens is used or a lower half lens, with the exception that the clip member 3 is reversed.

The modification shown in Figure 5 is a pair of eyeglasses embodying my invention but in which the full rim is replaced by a half rim 20 which half rim holds the particular half lens to be used.

It can be seen from the foregoing description that the lenses are firmly held in place with no possibility of the lenses becoming loose as is the case with lenses which are cemented in place. By means of my invention also the necessity for drilling small holes in the lenses is obviated which reduces the hazard of cracking lenses while fitting them. Also, the lenses are quickly and easily interchangeable with no danger of breaking the lens, by removing the clip member 3.

It is to be understood that the form of my invention, herewith shown and described can be modified by various changes in the shape, size and arrangement of parts without departing from the spirit of my invention, or the scope of the subjoined claims.

Having thus described my invention, I claim:

1. A pair of eyeglasses comprising half lenses, rims adapted to hold the half lenses and reversible clip members having a band portion comprising an elongated thin strip of material and wing portions at each end and at right angles to the band portion for receiving the lenses, each reversible clip member securing a half lens in position with respect to the rim.

2. A pair of eyeglasses comprising half lenses, rims adapted to hold the half lenses, hinge members and a bridge member, both the hinge members and the bridge member being provided with holes adapted to receive screws, clip members having a band portion engaging the horizontal edge of the half lens and wing portions embracing and holding the half lens, said wing portions extending beyond the band portion to form a forked end portion, the said wing portions being provided with holes registering with the holes in the hinge members and the bridge member when the clip members are in position and screws passing through said holes.

3. An attachment for conventional eyeglass frames for supporting half lenses therein comprising a clip member having a relatively thin band portion adapted to overlie the horizontal edge of the half lens, a pair of spaced wings projecting laterally from each end of the band portion and adapted to embrace the edges of the half lens, said wings being extended and apertured to receive fastening means securing the clip member in position on said frame, said clip member being reversible from a position with the wings disposed above the band portion to a position with the wings disposed below said band portion in dependence on the location of the half lens in the conventional eyeglass frame.

GEORGE DIRR.